United States Patent
Hino

(10) Patent No.: US 7,158,709 B2
(45) Date of Patent: Jan. 2, 2007

(54) THREE-DIMENSIONAL PERIODIC STRUCTURE AND FABRICATION METHOD THEREOF

(75) Inventor: Takeshi Hino, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 111 days.

(21) Appl. No.: 10/951,672

(22) Filed: Sep. 29, 2004

(65) Prior Publication Data

US 2005/0111807 A1    May 26, 2005

(30) Foreign Application Priority Data

Sep. 30, 2003  (JP) ............... 2003-340380

(51) Int. Cl.
*G02B 6/122* (2006.01)
(52) U.S. Cl. ................ 385/129; 385/141
(58) Field of Classification Search ............ None
See application file for complete search history.

(56) References Cited

U.S. PATENT DOCUMENTS

| 5,304,357 | A | 4/1994 | Sato et al. |
| 6,036,346 | A | 3/2000 | Hino et al. |
| 6,539,155 | B1 * | 3/2003 | Broeng et al. ............ 385/125 |
| 2005/0250856 | A1 * | 11/2005 | Maskaly et al. ............ 516/11 |

FOREIGN PATENT DOCUMENTS

| JP | 08-234007 | 9/1996 |
| JP | 2000-233999 | 8/2000 |
| JP | 2001-042144 | 2/2001 |
| JP | 2001-249234 | 9/2001 |
| JP | 2001-305359 | 10/2001 |
| JP | 2002-098846 | 4/2002 |
| JP | 2002-341161 | 11/2002 |

OTHER PUBLICATIONS

Rajesh Rengarajan et al., "Optical properties of a photonic crystal of hollow spherical shells," Applied Physics Letters, vol. 77, No. 27, Nov. 27, 2000, pp. 3517-3519.
Peng Jiang et al., "A Lost-Wax Approach to Monodisperse Colloids and Their Crystals," Science Magazine, vol. 291, Jan. 19, 2001, pp. 453-457.
Vladimir Kitaev et al., "Self-Assembled Surface Patterns of Binary Colloidal Crystals," Advanced Materials 2003, 15 No. 1, Jan. 3, pp. 75-78.

* cited by examiner

*Primary Examiner*—John D. Lee
*Assistant Examiner*—Jerry T Rahll
(74) *Attorney, Agent, or Firm*—Dickstein Shapiro LLP

(57) ABSTRACT

A photonic crystal comprises a matrix constituting said three-dimensional periodic structure, a first lattice formed in said matrix by first spherical voids having a uniform first diameter, said first spherical voids forming a face-centered cubic lattice, and a second lattice formed in said matrix by second spherical voids having a uniform second diameter smaller than said first diameter, said second spherical voids occupying interstitial sites of said first spherical voids.

26 Claims, 8 Drawing Sheets

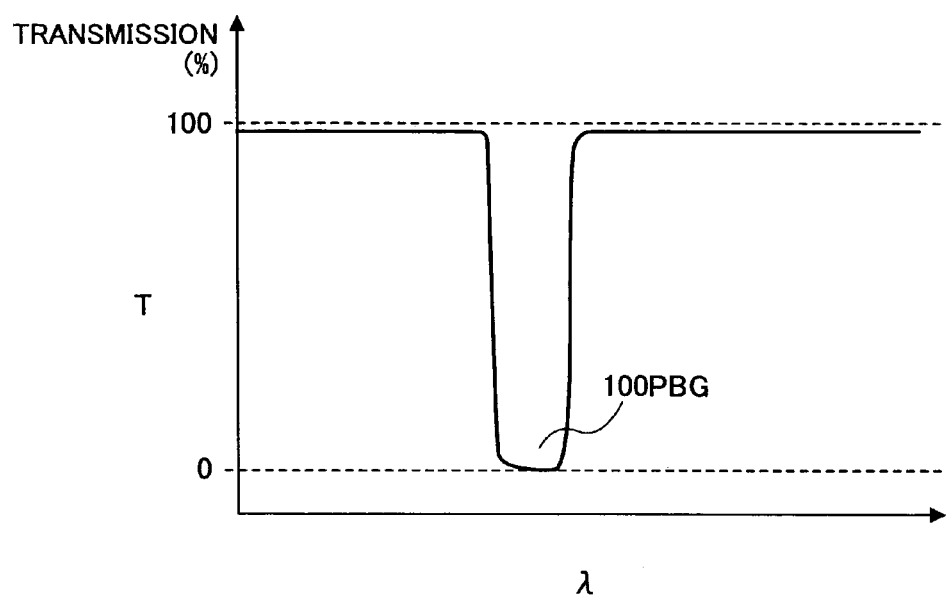
FIG.1 RELATED ART
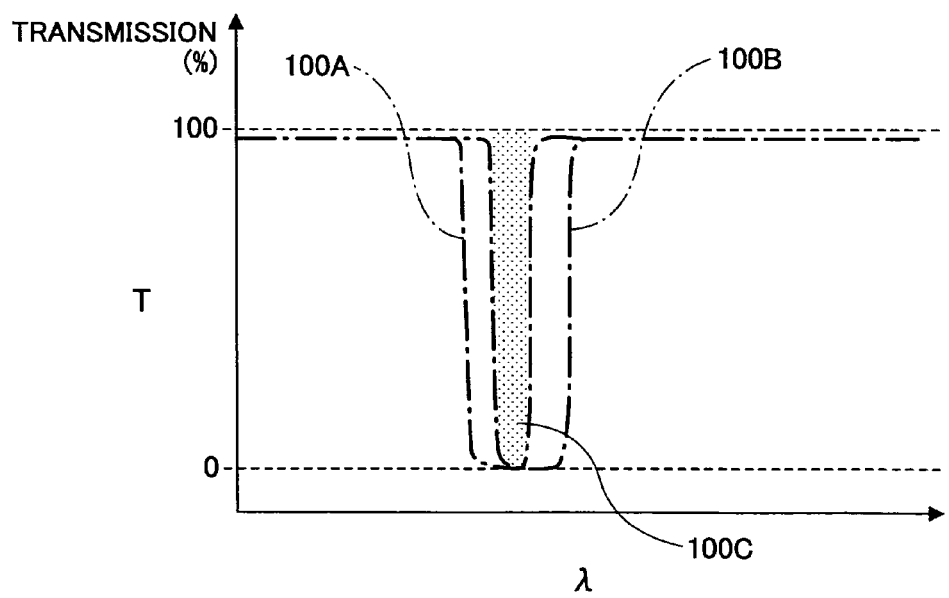
FIG.2 REALTED ART

THREE-DIMENSIONAL PERIODIC STRUCTURE AND FABRICATION METHOD THEREOF

BACKGROUND OF THE INVENTION

The present invention relates to a three-dimensional periodic structure including a photonic crystal having a high degree of ordering and exhibiting characteristics pertinent to such a three-dimensional periodic structure and the fabrication process thereof.

Conventionally, photonic crystals formed of fine particles have drawn interests in the field of optical circuits including waveguides and optical cavity devices. Hereinafter, conventional art of forming a photonic crystal by using fine particles will be reviewed briefly.

Japanese Laid-Open Patent Application 2000-233999 describes a conventional fabrication process of a photonic crystal that includes the steps of: introducing nano-particles into a template of fine opal crystals to form a structural body of nano-particles; and forming a photonic crystal as an inversion of the template by removing the fine particle opal crystals.

Japanese Laid-Open Patent Publication 2001-042144 describes a photonic crystal that uses a crystal structure of fine particles and fabrication process thereof, wherein this reference teaches a structure in which particles of an inorganic oxide are stacked in at least three layers.

Japanese Laid-Open Patent Application 2001-249234 describes the method of forming a photonic crystal according to the steps of: arranging fine particles in a polymer medium; and compressing the fine particles thus arranged.

Japanese Laid-Open Patent Application 2001-305359 describes a method of forming a photonic crystal from fine particles by dripping a suspension of spherical fine particles upon a substrate and by applying a load thereto such that the spherical particles form a closest packed structure.

Japanese Laid-Open Patent Application 2002-098846 describes a photonic crystal capable of changing a photonic bandgap thereof in response to an external force applied thereto and the fabrication process thereof, wherein the reference discloses a structure in which there is provided a regular arrangement of pores in a gel material.

Japanese Laid-Open Patent Application 2002-341161 describes a photonic crystal using fine particles and the fabrication process thereof, wherein the surface of the fine particles is modified by using a functional group such that the fine particles forming a three-dimensional structure are not merely connected with each other by electrostatic force but also by a strong chemical bond.

Japanese Patent 2,905,712 corresponding to Japanese Laid-Open Patent Application 08-234007 describes an opal-like diffraction film including therein a closest packed structure of fine particles.

Thus, among others, the Japanese Laid-Open Patent Publication 2000-233999 teaches the technology of forming a periodic structure by using a template of fine particles, wherein a similar technology of using a template is published also in academic journals, an example of which is Vicki L. Colvin, et al., "A Lost-Wax Approach to Monodisperse Colloids and Their Crystals" (SCIENCE VOL 291 Jan. 19, 2001, 453–457). This reference also describes the technique of replacing the periodic structure initially formed by fine particles with a periodic structure of another material or the use of spherical shells as the constituting element of the periodic structure.

As will be explained in detail later, it is very important that various periodic structures can be formed at the time of formation of such a periodic structure in order to enable control of the characteristics obtained as a result of the periodic structure.

Vladimir Kitaev, et al., "Self-Assembled Surface Patterns of Binary Colloidal Crystals" (ADVANCED MATERIALS 2003.15, No. 1 January 3, 75–78 (WILEY-VCH Verlag GmbH & Co), describes the technology of providing variety to a periodic structure by forming the periodic structure by using fine particles of different particle diameters.

REFERENCES

Patent Reference 1 Japanese Laid Open Patent Application 2000-233999 official gazette Patent Reference 2 Japanese Laid Open Patent Application 2001-042144 official gazette Patent Reference 3 Japanese Laid Open Patent Application 2001-249234 official gazette Patent Reference 4 Japanese Laid Open Patent Application 2001-305359 official gazette Patent Reference 5 Japanese Laid Open Patent Application 2002-098846 official gazette Patent Reference 6 Japanese Laid Open Patent Application No. 2002-341161 official gazette Patent Reference 7 Japanese Patent 2,905,712 (Japanese Laid Open Patent Application 08-234007 official gazette)

Non-patent Reference 1 Vicki L. Colvin etc., 'A Lost-Wax Approach to Monodisperse Colloids and Their Crystals' (SCIENCE VOL 291 19 January 2001, 453–457)

Non-patent Reference 2 Vladimir Kitaev, et al., 'Self-Assembled Surface Patterns of Binary Colloidal Crystals' (ADVANCED MATERIALS 2003.15, No. 1 January 3, 75–78 (WILEY-VCH Verlag GmbH & Co)

Non-patent Reference 3 Vicki L. Colvin, et al. 'Optical properties of a photonic crystal of hollow spherical shells' (APPLIED PHYSICS LETTERS VOLUME 77, NUMBER 22, 27 NOVEMBER 2000, 3517–3519)

The photonic crystal addressed by the present invention is defined as a material having a periodic structure in which two materials of different refractive indices (one of the materials may be the air) are arranged in spatial symmetry or regularity.

As a result of such regular and periodic structure, a photonic crystal exhibits properties not achievable hitherto by conventional optical materials, wherein the most significant effect would be the appearance of photonic bandgap (PBG).

FIG. 1 shows the transmission spectrum of a typical photonic crystal.

As shown in the transmission optical spectrum of FIG. 1, a photonic crystal has the nature of prohibiting transmission of light therethrough for the wavelength corresponding to the photonic bandgap (PBG) 100, while the photonic crystal passes the light of other wavelengths freely.

Here, the photonic bandgap (PBG) will be explained in more detail.

A photonic crystal having the nature of prohibiting passage of light of a particular wavelength in any directions is called a photonic crystal having a complete photonic bandgap.

FIG. 2 shows the transmission spectrum of a photonic crystal having such a complete photonic bandgap as viewed in two, different directions.

Referring to FIG. 2, the spectrum 100A shows the transmission spectrum as viewed in a direction 1 while the spectrum 100B shows the transmission spectrum as viewed in a direction 2 different from the direction 1. Thereby, it will be noted that the optical radiation having the wavelength corresponding to the wavelength range 100C is blocked completely by the photonic crystal in any of the directions 1 and 2. The optical radiation of this wavelength is thus confined in the crystal in all the directions, and associated with this, various applications are expected in the photonic crystals having such a complete photonic bandgap.

In practice, however, it is very difficult to obtain a photonic crystal having a complete photonic bandgap. In most photonic crystals, there appears a wavelength shift of transmission spectrum depending on the direction of optical propagation, and a transmission spectrum 100A in a direction 1 and a transmission spectrum 100B in a direction 2 do not overlap at all as shown in FIG. 3.

Thus, the photonic crystal shown in FIG. 3 does not have a complete photonic bandgap. In most photonic crystals, the desired blockade of optical propagation is achieved only in one specific direction, and propagation of optical waves in other directions is not blocked.

In order to realize a complete bandgap structure in a photonic crystal, it is necessary to achieve a large degree of refractive index modulation (large refractive index change) in the periodic structure and/or to choose a crystal structure advantageous for formation of the complete bandgap.

Hereinafter, conventional technology of forming a three-dimensional periodic structure for use as a photonic crystal that uses a self-assembling phenomenon of fine particles will be reviewed briefly.

It is known that a periodic structure having a face-centered cubic lattice structure can be obtained by utilizing a self-organizing phenomenon of fine particles. On the other hand, the desired complete photonic bandgap has not been realized with such a self-organization process of the fine particles because: (1) it is necessary to use spherical particles having an extremely uniform particle diameter in order to form a high-quality periodic structure suitable for a photonic crystal; (2) while silica or polystyrene are the only materials available currently for the spherical fine particles suitable for the formation of photonic crystals; and (3) silica or polystyrene is not a material having a large refractive index.

Further, in such photonic crystals formed by closest packing of fine particles and thus having a face-centered cubic lattice structure, there is a need of realizing a very large refractive index modulation in order to achieve the desired complete photonic bandgap. In the visible wavelength band, in particular, it has not been possible to obtain a complete photonic bandgap as long as the face-centered cubic arrangement is formed by using the fine particles of an ordinary available material.

In view of the situation noted above, there has been a proposal in the Japanese Laid-Open Patent Application 2000-233999 shown in FIG. 4, in which a three-dimensional periodic structure is formed at first as an assembly of fine particles, and the space formed between the fine particles is filled with a structural material 200 of large refractive index. Thereafter, the original fine particles are removed and there is formed a space 201 in the three-dimensional periodic structure in correspondence to the original fine particles. As a result of such a process, a photonic crystal having an inverse structure to the initial three-dimensional structure is obtained.

With regard to such an inverse structure, it is predicted, according to a simulation, that a complete photonic bandgap can be formed when the material having a refractive index of 3 or more is used for the structural material 200. On the other hand, with such a photonic crystal of inverse structure, the width of the complete photonic bandgap is very small, and imperfections in the crystal can provide a profound effect on the formation of the complete photonic bandgap. Thus, it is extremely difficult with this technology to obtain a photonic crystal of complete photonic bandgap over an extended wavelength range.

Further, the need of the material having the refractive index of 3 or more for the structural material 200, raises a problem, in that there may be no available material for a desired wavelength band. For example, $TiO_2$ is known to have a very high refractive index of 2.7–2.8 in the visible band, while this value is still not sufficient for realizing the complete photonic bandgap with the inverse structure.

In view of the situation noted above, there has been a proposal of using spherical shells for the three-dimensional periodic structure as shown in FIG. 5, wherein it will be noted that the three-dimensional periodic structure is formed of a structural material 300 and the spherical shells 301 including therein a spherical void are arranged periodically in the structural material. Reference should be made to Non-Patent Reference 3, op cit.

According to this approach, however, there appears a tendency that the imperfection of the crystal is increased during the formation process of the three-dimensional structure, and no photonic crystal having a complete photonic bandgap has been achieved yet.

Generally, photonic crystals having a complete bandgap has been attempted according to the design principle of decreasing the volumetric proportion of the high refractive index material in the photonic crystal while maintaining the fundamental symmetry of the face-centered cubic lattice structure.

More specifically, the volume fraction of the fine spherical particles constituting a face-centered cubic lattice structure has the value over 70%, while in the case of an inverted structure of such a periodic structure, the proportion of the high-refractive index material takes a much smaller value of slightly larger than 20%.

On the other hand, there are cases in which no suitable high-refractive index material is available in the desired wavelength band, particularly in the visible wavelength band, as noted before. Thus, in view of such a situation, the use of the hollow structure has been proposed in the Non-Patent Reference 3, op cit. as noted before, such that the volume fraction of the high-refractive index material is reduced further as compared with the case of the inverse structure. This approach, however, has not brought the desired results so far, as explained already.

SUMMARY OF THE INVENTION

Accordingly, it is an object of the present invention to provide a three-dimensional periodic structure having a volumetric fraction for the high-refractive index material constituting the three-dimensional periodic structure of smaller than that for the case the three-dimensional periodic structure has an inverse structure and the fabrication process of such a three-dimensional periodic structure in which the problem of increase of crystal imperfection is successfully avoided.

It should be noted that the application of the three-dimensional periodic structure of high degree ordering according to the present invention is not to a photonic crystal but the three-dimensional periodic structure of the present invention can be used for other various applications that utilizes the effect of the periodic structure. In such applications, it is very meaningful that the fine particles form not only the face-centered cubic structure but also other various periodic structures.

Thus, another object of the present invention is to provide a technology of forming various three-dimensional periodic structures by using fine particles so as to enable control of properties thereof in accordance with the needs of various applications the three-dimensional periodic structure.

Another object of the present invention is to provide a three-dimensional periodic structure comprising:

a first lattice of first particles having a uniform first diameter, said first particles forming a face-centered cubic lattice; and a second lattice of second particles having a uniform second diameter smaller than said first diameter, said second particles occupying interstitial sites of said first particles.

Thus, the three-dimensional periodic structure of the present invention is different from a simple face-centered cubic lattice of fine particles in the point that, because of occupation of the interstitial sites with the second particles, the free space between the particles is reduced as compared with the case of the simple face-centered cubic structure formed only of the first particles. Further, by using the three-dimensional periodic structure of the present invention as a template, it becomes possible to form a further three-dimensional periodic structure different from the three-dimensional periodic structure of the present invention.

In a preferred embodiment of the present invention, the remaining interstitial spaces in the three-dimensional periodic structure are filled with a third material.

In another aspect of the present invention, there is provided a three-dimensional periodic structure, comprising:

a matrix constituting said three-dimensional periodic structure;

a first lattice formed in said matrix by first spherical voids having a uniform first diameter, said first spherical voids forming a face-centered cubic lattice; and a second lattice formed in said matrix by second spherical voids having a uniform second diameter smaller than said first diameter, said second spherical voids occupying interstitial sites of said first spherical voids.

Thus, according to the present invention, the three-dimensional periodic structure is different from a simple face-centered cubic lattice of voids in the point that, because of occupation of the interstitial sites with the second spherical voids, the free space inside the three-dimensional periodic structure is increased as compared with the case of the simple inverse structure of face-centered cubic lattice formed only of the first voids. Thus, by using a high-refractive index material for the matrix, it is possible to realize a structure suitable and advantageous for forming a photonic crystal, particularly the photonic crystal having a complete bandgap.

In another aspect of the present invention, there is provided a three-dimensional periodic structure, comprising:

a matrix constituting said three-dimensional periodic structure;

a first lattice formed in said matrix by spherical voids having a uniform first diameter, said spherical voids forming a face-centered cubic lattice; and a second lattice formed in said matrix by spherical particles having a uniform second diameter smaller than said first diameter, said second spherical particles occupying interstitial sites of said first spherical voids.

Thus, according to the present invention, the three-dimensional periodic structure is different from a simple face-centered cubic lattice of voids in the point that the interstitial sites are occupied with the second spherical particles.

In another aspect of the present invention, there is provided a method of forming a three-dimensional periodic structure, comprising the steps of:

supplying a first suspension of generally spherical first particles having a first diameter into a gap formed by a pair of substrates to form an ordered structure of said first particles in said gap;

supplying a second suspension of generally spherical second particles having a second smaller diameter into said gap such that said second particles settle in interstitial sites of said first particles; and removing a dispersion medium of said first and second suspensions from said gap.

According to the present invention, it becomes possible to introduce the second particles into the interstitial sites of the first particles without destroying the ordered structure of the first particles, and a three-dimensional structure including a face-centered first lattice of the first particles and a second lattice of the second particles are obtained.

In a preferred embodiment, there is further provided with a step, after removing said dispersion medium, of filing a space formed between said first and second particles with a matrix. With this, a three-dimensional periodic structure formed of a first lattice of the first particles forming a face-centered cubic lattice and a second lattice of the second particles occupying the interstitial sites and the space inside the three-dimensional periodic structure is filled with the matrix is obtained.

In a further preferred embodiment, there is provided with a step, after filing said space with said matrix, of removing said first and second particles. With this, an inverse three-dimensional periodic structure comprising a first, face-centered cubic lattice of first voids corresponding to the first particles and a second lattice of second voids corresponding to the second particles is formed in the matrix. With such an inverse structure, the proportion of the free space inside the structure is increased significantly.

In an alternative embodiment of the present invention, there is further provided a step, after filling said space with said matrix, of removing said first particles selectively. With this, an inverse three-dimensional periodic structure comprising a first, face-centered cubic lattice of first voids corresponding to the first particles and a second lattice of the second particles occupying the interstitial sites of the first voids is obtained in the matrix.

Thus, according to the present invention, it becomes possible to obtain a three-dimensional periodic structure having an increased degree of spatial modulation of refractive index as compared with the conventional three-dimensional periodic structures of the inverse structure or hollow structure, by reducing the volume of the high-refractive index material in the three-dimensional periodic structure.

BRIEF DESCRIPTION OF THE DRAWINGS

FIG. 1 is a diagram showing a transmission optical spectrum of a photonic crystal;

FIG. 2 is a diagram explaining the transmission optical spectrum of a photonic crystal having a complete bandgap.

DETAILED DESCRIPTION OF THE INVENTION

First Embodiment

Figure 6A:
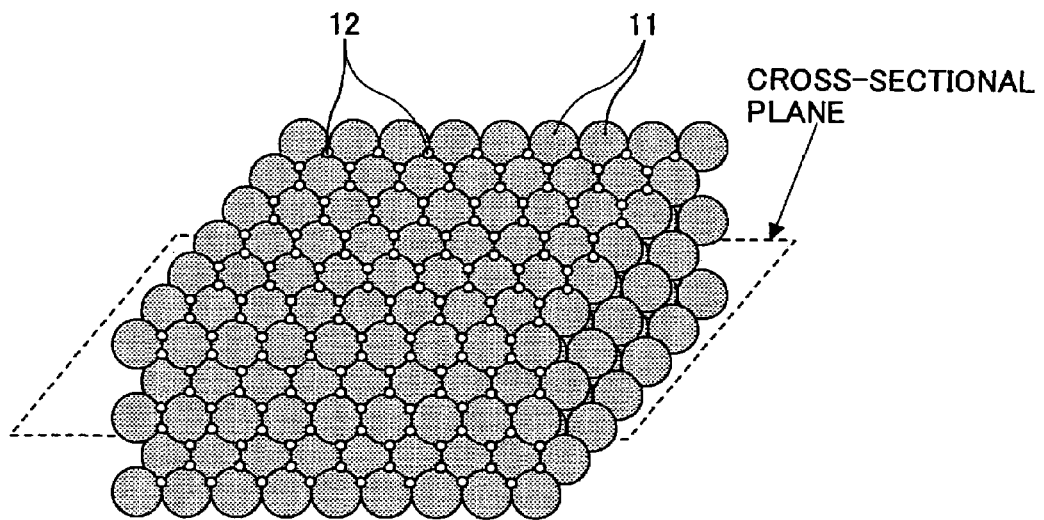
FIGS. 6A and 6B are diagrams explaining a three-dimensional periodic structure according to a first embodiment of the present invention.
Figure 6B:
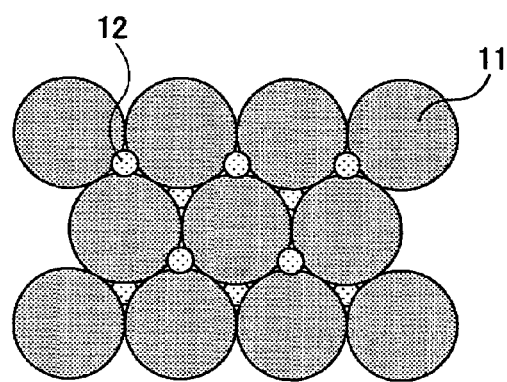
Figure 7:
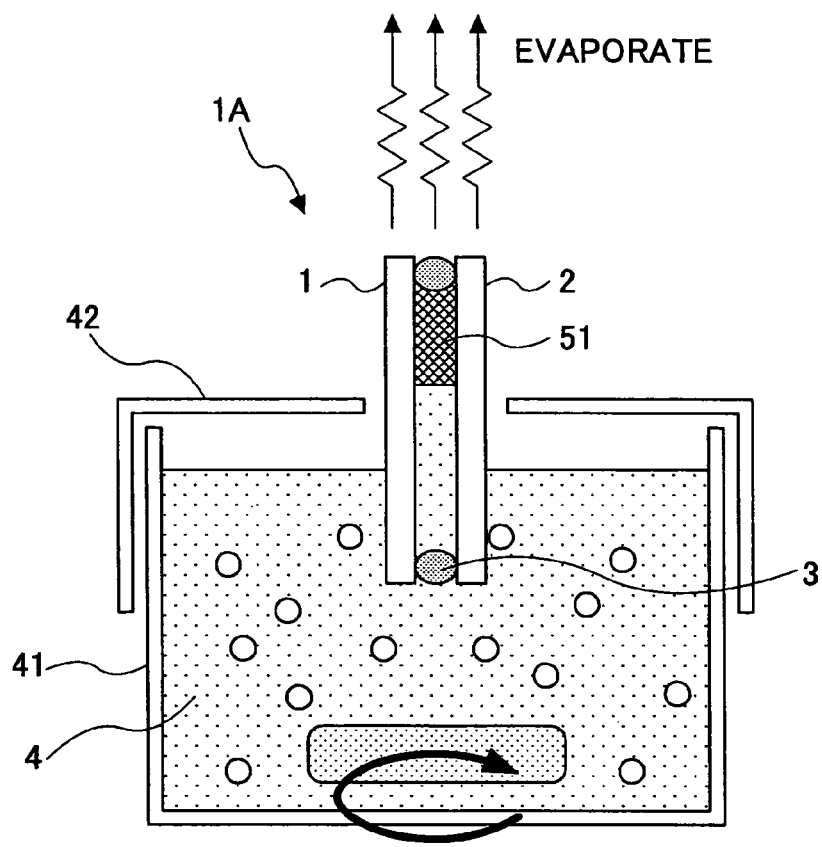
FIG. 7 is a diagram showing the process of forming the periodic structure of FIGS. 6A and 6B.

FIGS. 6A and 6B show the construction of a three-dimensional periodic structure for use as a photonic crystal according to a first embodiment of the present invention, wherein FIG. 6A is a perspective view of the three-dimensional periodic structure while FIG. 6B is a cross-sectional view of the structure of FIG. 6A taken along a cross-sectional plane shown therein.

Referring to FIGS. 6A and 6B, the three dimensional periodic structure of the present invention includes a first lattice of first spherical particles 11 having a uniform first diameter, wherein the first spherical particles 11 are stacked to form a cubic closest packing structure characterized by a face-centered cubic lattice structure.

Further, the three-dimensional periodic structure of the present invention includes a second lattice of second particles 12 having a uniform second diameter smaller than the first diameter, wherein the second particles 12 occupy interstitial sites of the first particles 11 as shown in FIG. 6B and forms a second face centered cubit lattice structure.

Typically, the first spherical fine particles 11 are formed of polystyrene and have a uniform diameter of about 300 nm. This diameter is adjusted in accordance with the desired wavelength of the photonic bandgap. In the foregoing example, the photonic bandgap is formed at the wavelength of about 700 nm.

On the other hand, the second spherical fine particles 12 are formed of silica and have a uniform diameter of about 33 nm, for example. The diameter of the second particles 12 is chosen such that the second particles 12 settle stably in the respective interstitial sites formed by the first particles 11.

Hereinafter, the method of forming the three-dimensional periodic structure of the present embodiment will be explained.

Generally, the three-dimensional periodic structure of FIGS. 6A and 6B is started with supplying a suspension of the first particles 11 into a gap formed by a pair of substrates. With this, there is formed an ordered structure of the first particles 11 in the suspension held between the foregoing substrates, and a suspension of the second particles 12 is supplied to the foregoing gap. Thereby, the second particles 12 having a smaller particle diameter are transported in the medium constituting the suspension between the first particles 11 and settle in the interstitial sites available for the second particle 12.

Hereinafter, examples of forming the three-dimensional periodic structure of FIGS. 6A and 6B will be explained with reference to FIGS. 7–10.

First, a suspension 4 of the first fine particles 11 is prepared by dispersing monodisperse polystyrene spherical particles having a uniform diameter of 300 nm in an ethanol dispersion medium with a concentration of 1 wt %. Similarly, a suspension 7 of the second particles 12 is prepared by dispersing monodisperse silica particles having a uniform diameter of 33 nm in an ethanol dispersion medium with a concentration of 0.5 wt %.

Next, a glass substrate 1 and a glass substrate 2 are assembled with each other to form a substrate assemblage structure 1A via an intervening gap member 3 formed of a particle having a diameter of 10 μm, such that there is formed a space having a thickness of about 10 μm in the substrate assemblage structure 1A between the foregoing substrates 1 and 2.

Next, a vessel 41 is filled with the suspension 4, and the bottom edge of the substrate assemblage structure 1A is dipped into the suspension 4 held in the vessel 41 in the state that the top part of the vessel 41 is covered with a cover 42 that prevents evaporation of the solvent from the surface of the suspension 4.

In such a construction, there occurs evaporation of the dispersion medium at the top end part of the substrate assemblage structure 1A, and with this, the suspension 4 is gradually pulled into the gap formed between the substrates 1 and 2 in the upward direction in the substrate assemblage structure 1A. Thereby, there is caused an accumulation of the first particles 11 at the top end part of the substrate assemblage structure 1A and a loose ordered accumulate structure 51 of the fine particles is formed at such a part.

During this process, the suspension 4 in the vessel 41 is subjected to agitation by a stirrer, and the like, so as to avoid deposition or condensation of the fine particles 11 in the vessel 41. The time needed for such a process is about 4 days in the case a structure having a size of 1.0 cm×1.5 cm is to be obtained for the ordered accumulate structure 51, although this duration depends naturally on the evaporation rate of the dispersion medium. Thereafter, the substrate assemblage structure 1A is pulled up from the suspension 4.

Figure 8:
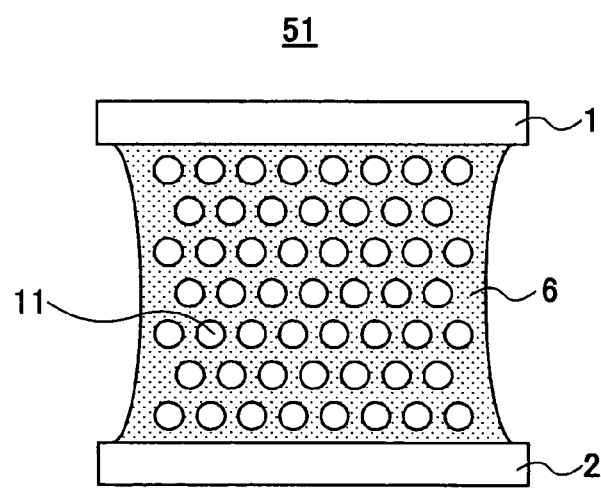
FIG. 8 is a diagram explaining an example of the first embodiment.

In the state the substrate assemblage structure 1A is pulled up after the accumulation of the first fine particles 11, it should be noted that there still remains a film 6 of ethanol between the first fine particles 11 that form a face-centered cubic lattice structure in the accumulate structure 51 as shown in FIG. 8, wherein it should be noted that, because of the existence of the intervening ethanol film, the first fine particles 11 do not form a closely packed structure yet in the accumulate structure 51.

Figure 9:
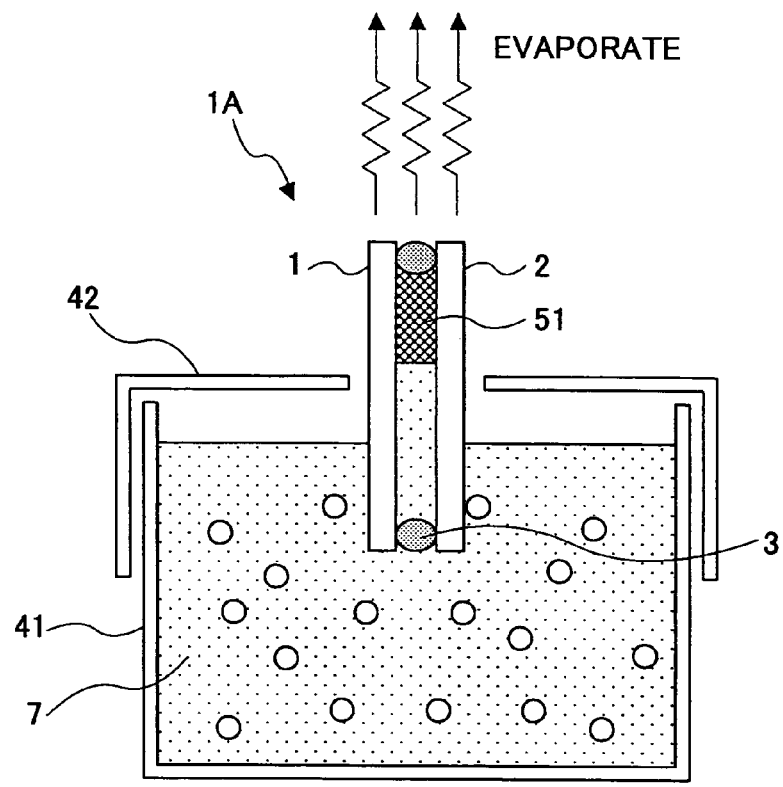
FIG. 9 is a diagram explaining filling of nano-particles.

Thus, in the present embodiment, the accumulate structure 51 held in the substrate assemblage structure 1A between the substrates 1 and 2 is dipped into the second suspension 7 in the state that there still remains the ethanol film between the first fine particles 11 as shown in FIG. 9. Thereby, because of the evaporation of the dispersion solvent at the top part of the substrate assemblage structure 1A, there is caused a flow of the suspension 7 between the substrates 1 and 2 in the upward direction toward the accumulate structure 51.

In the state of FIG. 9, the first particles 11 are not yet closely packed in the accumulate structure 51, and thus, the second particles cause diffusion through the accumulate structure 51 along the path between adjacent particles 11 with the flow of the second suspension 7.

Figure 10:
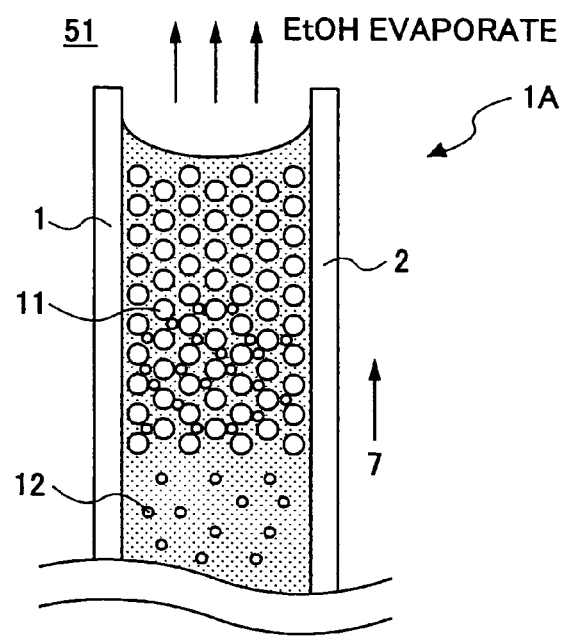
FIG. 10 is a diagram explaining diffusion of second nano-particles into an ordered structure of first nano-particles.

FIG. 10 shows the state in which the second particles 12 cause diffusion through the accumulate structure 51 between the particles 11.

Because the first particles 11 form an ordered structure that minimizes the overall energy of the accumulate structure 51, the ordered structure of the first particles 11 is stable even when the second particles of small diameter have caused invasion as a result of the diffusion process of FIG. 10, and there is little risk that the ordered structure of the first particles 11 in the accumulate structure 51 is destroyed. This diffusion process of the second particles is conducted typically for 5 days, and the substrate assemblage structure 1A is pulled up from the second suspension 7.

Thereafter, while holding the accumulate structure 51 between the substrates 1 and 2, the accumulate structure 51 is dried starting from one direction, and with this, the ethanol existing between the fine particles 11 and 12 is removed. With this, the particles 11 and 12 are compacted, and the three-dimensional periodic structure explained with reference to FIGS. 6A and 6B is obtained.

With this process, it is possible to achieve a long-range ordering for the second particles 12

In the present embodiment, it is important to use a proper diameter for the second particles 12 such that the second particles 12 settle into the site formed by the face-centered cubic lattice of the first particles 11. In the case the first particles 11 have the diameter of 300 nm, it is preferable to use the diameter of 33 nm for the second particles, while this diameter of the second particles 12 can be changed in the range of 32–34 nm. In the case the first particles 11 are formed of silica and have the diameter of 350 nm in correspondence to the photonic bandgap wavelength of about 770 nm, it is preferable that the second particles 12 are formed also of silica and have the diameter of 38.5 nm. Further, in the case the first particles 11 are formed of silica and have the diameter of 400 nm in correspondence to the photonic bandgap wavelength of about 880 nm, it is preferable that the second particles 12 are also formed of silica and have the diameter of 32–34 nm.

Second Embodiment

In the present embodiment, a three-dimensional structure similar to the one shown in FIGS. 6A and 6B is formed at first while using monodisperse spherical polystyrene particles having a diameter of 300 nm for the first particles 11 and monodisperse spherical silica particles having a diameter of 33 nm for the second particles 12.

Figure 11:
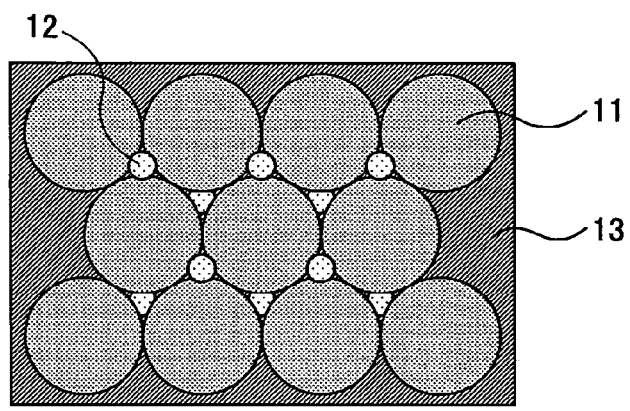
FIG. 11 is a diagram showing a three-dimensional periodic structure according to a second embodiment of the present invention.

The three-dimensional periodic structure thus obtained is subjected to an annealing process conducted at 100° C. for 3 hours and is dipped thereafter into a suspension of titanium oxide nano-particles, in which particles of titanium oxide having a diameter of 1 nm or less are dispersed in an ethanol medium with a concentration of 0.5 wt %. After immersion for three days, the three-dimensional periodic structure is dried for removal of ethanol, and there is obtained a three-dimensional periodic structure as shown in FIG. 11 in which the three-dimensional periodic structure of the first particles 11 of a first material (polystyrene) and the second particles 12 of a second material (silica) is embedded in a matrix 13 of a third material (titanium oxide).

Third Embodiment

In the present embodiment, the three-dimensional periodic structure as shown in FIGS. 6A and 6B is formed at first while using monodisperse silica particles for both the first particles 11 and the second particles 12, wherein the first particles 11 have the uniform diameter of 300 nm similarly as before and the second particles 12 have the uniform diameter of 33 nm similarly as before. Thereby, the face-centered cubic lattice of the first particles 11 is formed by using a suspension dispersed with the silica particles of the 300 nm diameter with a concentration of 1 wt % for the suspension 4, while the face-centered cubic lattice of the second particles 12 is formed by using the suspension 7 explained before.

More specifically, the foregoing three-dimensional periodic structure is formed similarly to the process of FIGS. 7–10, by first forming the substrate assemblage structure 1A by assembling the glass substrates 1 and 2 with a gap of 10 μm thickness via the intervening gap member 3 having the diameter of 10 μm and further by dipping the substrate assemblage structure 1A into the first suspension 4.

As a result of evaporation of the ethanol dispersion medium at the top end of the substrate assemblage structure 1A, the suspension 4 is pulled into the gap formed between the substrates 1 and 2 toward the top end part thereof where the evaporation of the dispersion medium takes place, and there occurs the accumulation of the first particles 11 of silica at the top end part of the substrate assemblage structure 1A. By continuing such a process for 4 days, for example, the accumulate structure 51 including therein the ordered structure of the silica particles 11 is obtained with the size of 1.0 cm×1.5 cm.

Thereafter, the substrate assemblage structure 1A is pulled up from the suspension 4 and is dipped into the second suspension 7 together with the accumulate structure 51 held therein in the state that the ethanol medium still remains between the fine particles 11 of the accumulate structure 51.

Thereby, because of the evaporation of the ethanol dispersion medium taking place at the top end part of the substrate assemblage structure 1A, there is caused a flow of the second suspension 7 in the substrate assemblage structure 1A toward the accumulation structure 51 held therein, and the second particles 12 of silica in the second suspension 7 cause diffusion into the foregoing accumulation structure 51 as explained with reference to FIG. 10. This diffusion process is continued for 5 days. Thereafter, the substrate assemblage structure 1A is pulled up from the second suspension 7.

Thereafter, the ethanol dispersion medium is eliminated from the accumulate structure 51 in the state it is held between the substrates 1 and 2 by conducting a drying process from one end of the accumulate structure 51 of the silica particles 11 and 12.

Thereafter, the accumulate structure 51 is taken out from the substrate assemblage structure 1A and is subjected to an annealing process conducted at 400° C. for 1 hour to form a three-dimensional periodic structure of the silica particles 11 and 12. The three-dimensional periodic structure thus annealed is then immersed into a suspension of titanium oxide nano-particles containing nano-particles of titanium oxide having a diameter of 1 nm or less dispersed in a dispersion medium of ethanol with a concentration of 0.5 wt %, for the duration of 3 days.

Thereafter, the three-dimensional periodic structure is taken out from the suspension and subjected to a drying process. With this, a three-dimensional periodic structure in which the foregoing three-dimensional periodic structure of the silica particles 11 and 12 is embedded in the matrix 13 of titanium oxide (material 3) is obtained. So far, it should be noted that the process is the same as the process of the second embodiment.

In the present embodiment, it should be noted that the three-dimensional periodic structure thus obtained is immersed in a hydrofluoric acid solution of 1% concentration for 1 day. Thereby, the silica particles 11 and 12 are dissolved in view of the fact that the first particles 11 forming the first lattice of the face-centered cubic structure are contacting with each other and are dissolved by the hydrofluoric acid consecutively. Similarly, the second particles 12 of silica are contacted with the coordinating first silica particles 11 in the interstitial site and are thus dissolved consecutively.

Figure 12:
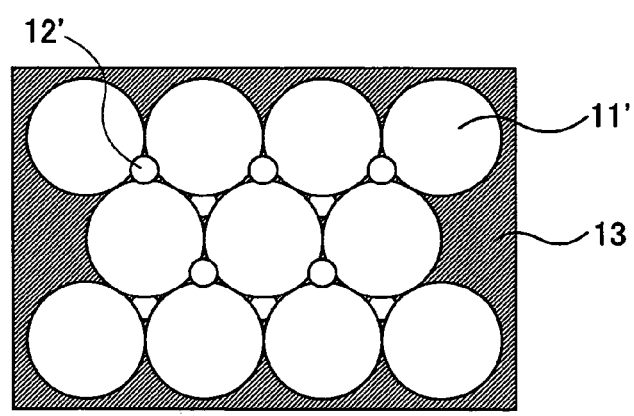
FIG. 12 is a diagram showing a three-dimensional periodic structure according to a third embodiment of the present invention.

As a result, there is formed a three-dimensional periodic structure in the matrix 13 of titanium oxide as shown in FIG. 12 by the voids 11' and 12' respectively corresponding to the silica particles 11 and the silica particles 12.

Figure 3:
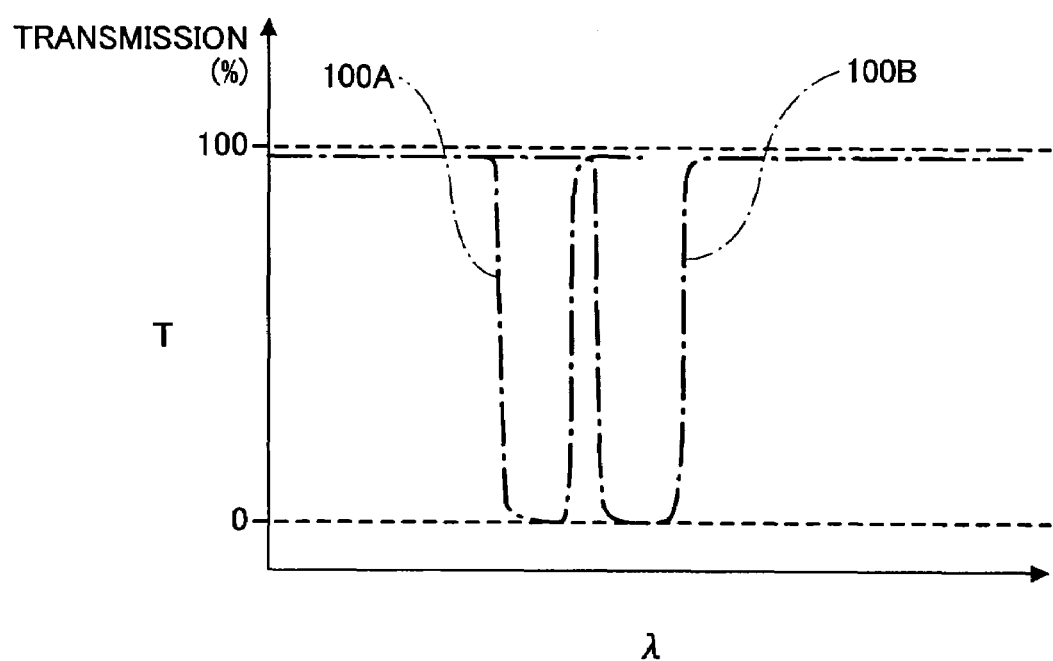
FIG. 3 is a diagram explaining the transmission optical spectrum of an ordinary photonic crystal not having a complete photonic bandgap.
Figure 4:
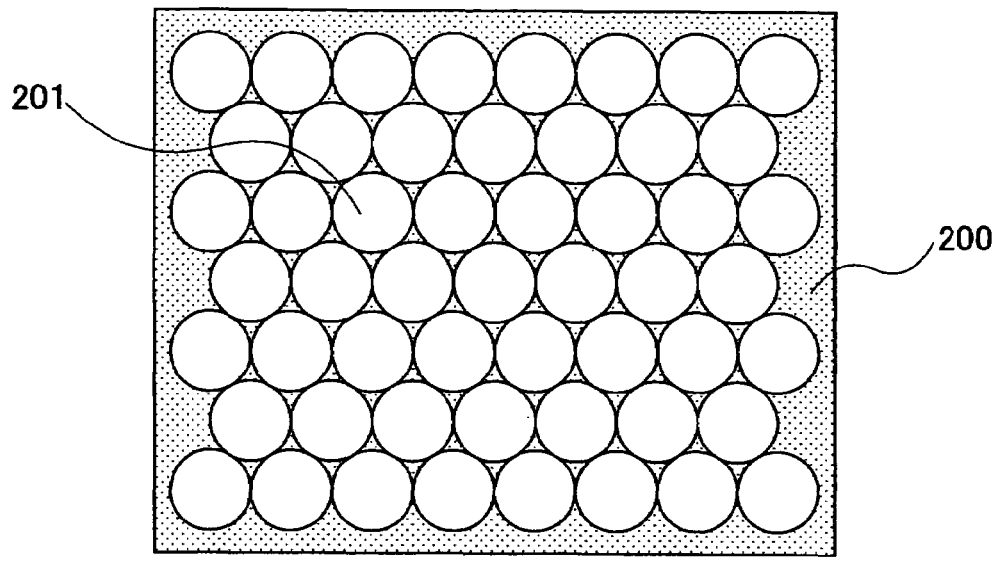
FIG. 4 is a diagram explaining an inverse periodic structure.
Figure 5:
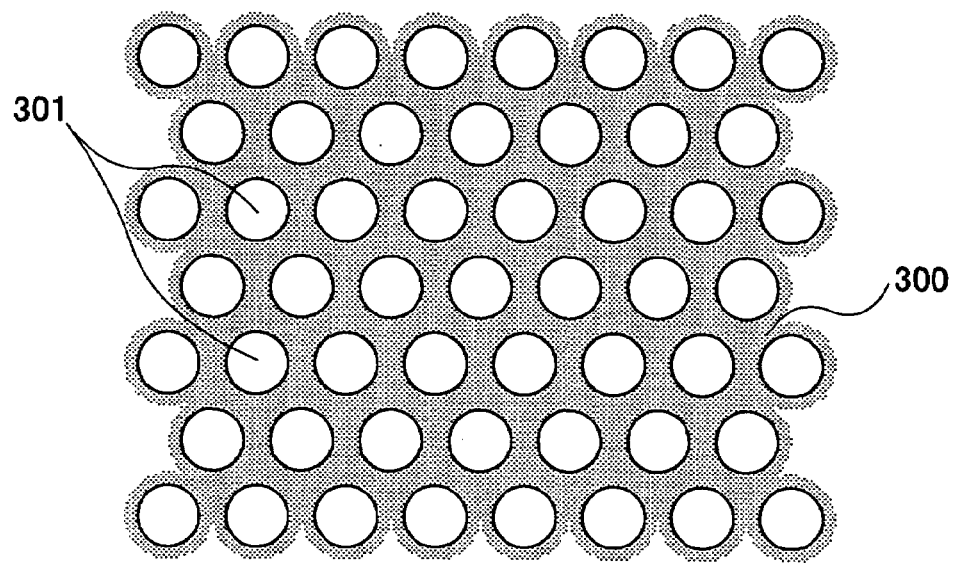
FIG. 5 is a diagram showing a hollow periodic structure that uses hollow spherical shells.

In the structure of FIG. 12, it should be noted that a large refractive index change is achieved between the voids 11' or 12' filled with the air and the matrix 13 filled with titanium oxide having a high-refractive index. Further, because of the formation of the voids 12' in addition to the voids 11', the volume ratio of the high-refractive matrix 13 in such a three-dimensional periodic structure is reduced further as compared with the conventional structure of FIG. 4, and it becomes possible to achieve the complete photonic bandgap explained with reference to FIG. 2.

Fourth Embodiment

In a fourth embodiment of the present invention, the three-dimensional periodic structure of FIG. 11 is dipped in tetrahydrofuran (THF) for 1 day for selective removal of the polystyrene particles 11. Similarly to the case of the previous embodiment, the first particles 11 forming the face-centered cubic lattice are contacted with each other, and thus, the first particles 11 are dissolved one by one by THF, while leaving the second particles 12 or the matrix 13 unchanged.

Figure 13:
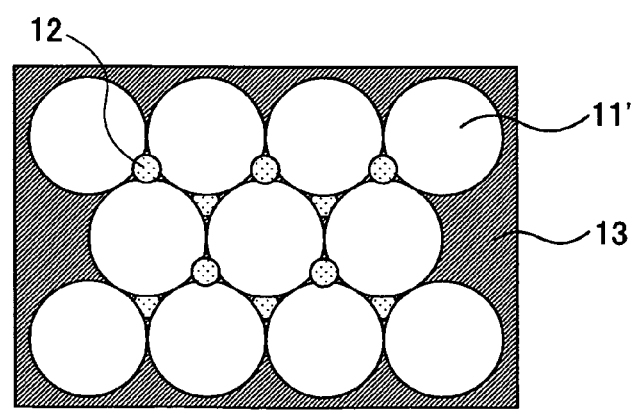
FIG. 13 is a diagram showing a three-dimensional periodic structure according to a fourth embodiment of the present invention.

FIG. 13 shows the three-dimensional periodic structure formed according to such a process.

Summarizing above, the present invention introduces small spherical particles 12 into the ordered structure of large spherical particles 11 formed in a liquid process, in the state that the large spherical particles 11 are still separated from each other by a fluid used for the liquid process. Thereby, the small spherical particles easily invade into such an ordered structure and settle in the interstitial sites formed by the large particles without substantially straining the ordered structure.

In any of the foregoing first through fourth embodiments, it should be noted that the spherical particles 11 or 12 are not limited to polystyrene or silica but other materials including a metal oxide such as silica or titania, other inorganic dielectrics, metals, semiconductors, or organic materials may be used. Similarly, the matrix 13 is not limited to titanium oxide but other materials including a metal oxide of silica or titania, other inorganic dielectrics, semiconductors, or organic materials may also be used.

What is important in the present invention is to use the material having a uniform particle size and sharp particle size distribution for the first and second particles and choose the diameter of the second particles such that the second particles can settle in the interstitial sites formed by the first particles. In addition, it is important to choose the material for the large particles and small particles such that the large particles and small particles can be removed after formation of the three-dimensional periodic structure with respect to the matrix.

Fifth Embodiment

Figure 14A:
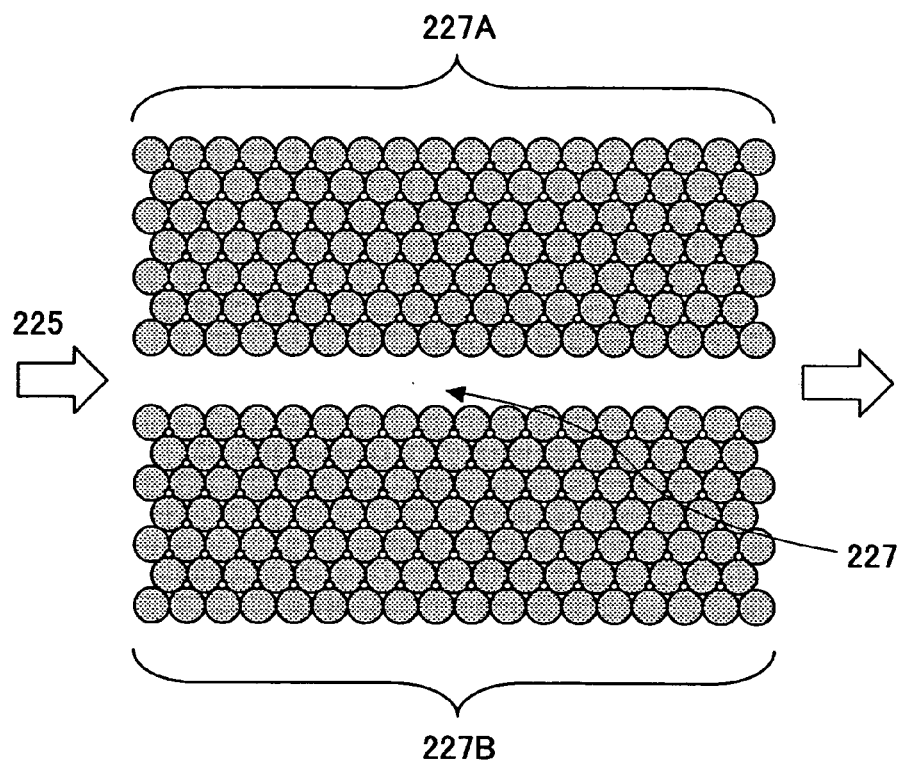
FIGS. 14A and 14B are diagrams showing a waveguide that uses such a photonic crystal.

FIG. 14A is a diagram showing an optical waveguide that uses the photonic crystal formed by the three-dimensional periodic structure of the present invention as the cladding layer.

Referring to FIG. 14A, the optical waveguide is formed of the three-dimensional periodic structure of any of the first through fourth embodiments and thus includes a first face-centered lattice of larger spheres or voids and a second face-centered lattice of smaller spheres or voids.

Thereby, it will be noted that there is formed a linear defect 277 in such a three-dimensional periodic structure such that the linear defect 277 divides the three-dimensional periodic structure into a first part 227A and a second part 227B.

Thereby, the linear defect 277 functions as a waveguide guiding an incident optical beam 225 supplied to a first end of the waveguide 227 to a second, opposite end thereof.

Figure 14B:
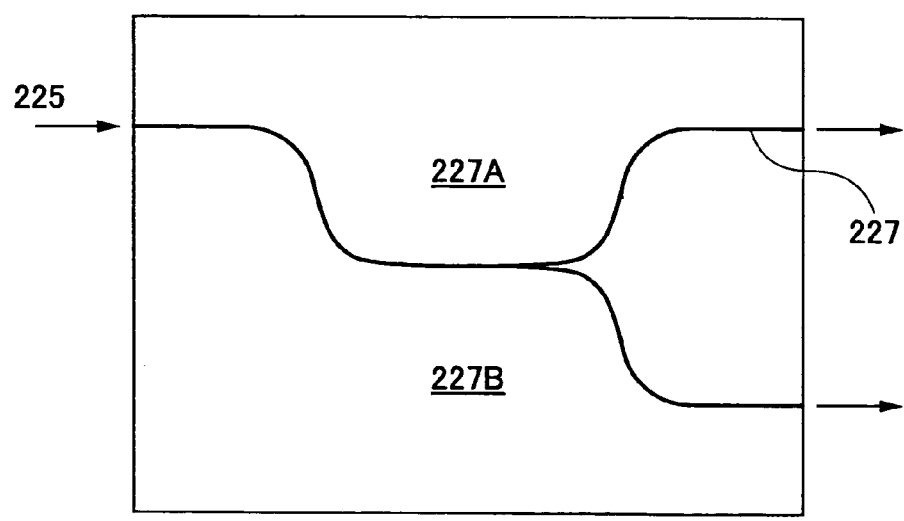

In the present invention, because the three-dimensional periodic structure forms a complete bandgap, it is possible to bend or curve or branch the linear defect 227 as desired with a desired angle, and the degree of designing of optical circuit is increased substantially when the three-dimensional periodic structure of the present invention is used for such an optical waveguide as shown in FIG. 14B.

Further, the present invention is by no means limited to the embodiments described heretofore, but various variations and modifications may be made without departing from the scope of the invention.

What is claimed is:

1. A photonic crystal, comprising:
   a matrix constituting a three-dimensional periodic structure;
   a first lattice formed in said matrix by first spherical voids having a uniform first diameter, said first spherical voids forming a face-centered cubic lattice; and
   a second lattice formed in said matrix by second spherical voids having a uniform second diameter smaller than said first diameter, said second spherical voids occupying interstitial sites of said first spherical voids.

2. The photonic crystal as claimed in claim 1, wherein said second lattice forms a face-centered cubic lattice.

3. The photonic crystal as claimed in claim 1, wherein said matrix comprises titanium oxide.

4. The photonic crystal as claimed in claim 1, wherein said second spherical voids have a diameter chosen so as to settle into said interstitial sites formed by said first spherical voids.

5. The photonic crystal as claimed in claim 1, wherein said first spherical voids have a uniform diameter of about 300 nm, and wherein said second spherical voids have a uniform diameter of 32–34 nm.

6. The photonic crystal as claimed in claim 5, wherein said second spherical voids have a diameter of about 33 nm.

7. An optical element including an optical waveguide, said optical waveguide including a cladding layer of a photonic crystal and an optical path formed in said photonic crystal, said photonic crystal comprising:

a matrix constituting a three-dimensional periodic structure;

a first lattice formed in said matrix by first spherical voids having a uniform first diameter, said first spherical voids forming a face-centered cubic lattice; and a second lattice formed in said matrix by second spherical voids having a uniform second diameter smaller than said first diameter, said second spherical voids occupying interstitial sites of said first spherical voids.

8. The photonic crystal as claimed in claim 7, wherein said second lattice forms a face-centered cubic lattice.

9. The photonic crystal as claimed in claim 7, wherein said matrix comprises titanium oxide.

10. The photonic crystal as claimed in claim 7, wherein said second spherical voids have a diameter chosen so as to settle into said interstitial sites formed by said first spherical voids.

11. The photonic crystal as claimed in claim 7, wherein said first spherical voids have a uniform diameter of about 300 nm, and wherein said second spherical voids have a uniform diameter of 32–34 nm.

12. The photonic crystal as claimed in claim 11, wherein said second spherical voids have a diameter of about 33 nm.

13. A three-dimensional periodic structure comprising:
a first lattice of first particles having a uniform first diameter, said first particles forming a face-centered cubic lattice; and
a second lattice of second particles having a uniform second diameter smaller than said first diameter, said second particles occupying interstitial sites of said first particles,
wherein remaining interstitial sites in the three-dimensional periodic structure are filled with a third material.

14. The three-dimensional periodic structure as claimed in claim 13, wherein said second lattice forms a face-centered cubic lattice.

15. A three-dimensional periodic structure, comprising:
a matrix constituting said three-dimensional periodic structure;
a first lattice formed in said matrix by spherical voids having a uniform first diameter, said spherical voids forming a face-centered cubic lattice; and
a second lattice formed in said matrix by spherical particles having a uniform second diameter smaller than said first diameter, said second spherical particles occupying interstitial sites of said first spherical voids.

16. A three-dimensional periodic structure, comprising:
a matrix constituting said three-dimensional periodic structure;
a first lattice formed in said matrix by first spherical voids having a uniform first diameter, said first spherical voids forming a face-centered cubic lattice; and
a second lattice formed in said matrix by second spherical voids having a uniform second diameter smaller than said first diameter, said second spherical voids occupying interstitial sites of said first spherical voids.

17. The three-dimensional periodic structure as claimed in claim 16, wherein said second lattice forms a face-centered cubic lattice.

18. A method of forming a three-dimensional periodic structure, comprising the steps of:
supplying a first suspension of generally spherical first particles having a first diameter into a gap formed by a pair of substrates to form an ordered structure of said first particles in said gap;
supplying a second suspension of generally spherical second particles having a second smaller diameter into said gap such that said second particles settle in interstitial sites of said first particles;
removing a dispersion medium of said first and second suspensions from said gap; and
filling remaining interstitial sites with a third material to form a matrix.

19. The method as claimed in claim 18, wherein said second particles form a face-centered cubic lattice.

20. The method as claimed in claim 18, wherein said step of supplying said second particles is conducted in a state in which there remains a film of a dispersion medium of said first suspension between adjacent first particles.

21. The method as claimed in claim 18, wherein said second particles have a diameter so as to settle in said interstitial sites formed by said first particles.

22. The method as claimed in claim 21, wherein said first particles have a uniform diameter of about 300 nm and said second particles have a uniform diameter of 32–34 nm.

23. The method as claimed in claim 22, wherein said second particles have a uniform diameter of about 33 nm.

24. The method as claimed in claim 18, further comprising the step of removing at least said first particles selectively with respect to said matrix.

25. The method as claimed in claim 24, wherein said first and second particles comprise any of polystyrene and silica, and wherein said third material comprises titanium oxide.

26. The method as claimed in claim 24, wherein said step of removing said first particles is conducted such that said second particles are removed simultaneously.

* * * * *